United States Patent [19]

Stenzel

[11] 3,880,982

[45] Apr. 29, 1975

[54] PROCESS FOR REMOVING NITROGEN OXIDES FROM EXHAUST GASES

[76] Inventor: Jürgen Stenzel, Knapsack Aktiengesellschaft, Knapsack bei Cologne, Erftstadt Liblar, Germany

[22] Filed: Dec. 26, 1972

[21] Appl. No.: 318,672

[30] Foreign Application Priority Data
Dec. 30, 1971  Germany............................ 2165548

[52] U.S. Cl............ 423/213.2; 252/466 J; 252/471; 423/239; 423/213
[51] Int. Cl.............................................. B01d 53/00
[58] Field of Search............ 423/213.2, 213.5, 213.7, 423/239; 60/301; 252/463, 466 J, 471

[56] References Cited
UNITED STATES PATENTS

| | | | |
|---|---|---|---|
| 2,071,119 | 2/1937 | Harger............................ | 423/213.2 |
| 2,924,504 | 2/1960 | Reitmeier........................... | 423/239 |
| 3,216,954 | 11/1965 | Howk et al....................... | 252/471 X |
| 3,228,746 | 1/1966 | Howk et al....................... | 423/213.7 |
| 3,231,516 | 1/1966 | Gary................................. | 423/213.2 |
| 3,493,325 | 2/1970 | Roth................................ | 423/213.7 |
| 3,681,260 | 8/1972 | Foucher et al..................... | 252/465 |
| 3,699,683 | 10/1972 | Tourtellotte et al......... | 423/213.5 X |
| 3,757,521 | 9/1973 | Tourtellotte et al......... | 423/213.7 X |

FOREIGN PATENTS OR APPLICATIONS
1,002,160   8/1965   United Kingdom.............. 423/213.5

*Primary Examiner*—G. O. Peters
*Attorney, Agent, or Firm*—Connolly & Hutz

[57] ABSTRACT

Nitrogen oxides are removed from exhaust gases, particularly from exhaust gases of internal combustion engines or from exhaust gases obtained in the production of nitric acid. To this end, the nitrogen oxides are reduced to nitrogen with the use of a gaseous reductant, in contact with a catalyst and at elevated temperatures. More particularly, the nitrogen oxide-containing gas in admixture with at least stoichiometric proportions, based on the nitrogen content of the gas, of hydrogen and/or carbon monoxide and/or gaseous hydrocarbon reductants, is contacted at temperatures substantially between 150 and 1100°C, with a catalyst comprising a homogeneous mixture of oxides and/or aluminates of copper, nickel and manganese.

13 Claims, No Drawings

PROCESS FOR REMOVING NITROGEN OXIDES FROM EXHAUST GASES

The present invention relates to a process for removing nitrogen oxides from exhaust gases, particularly from those which are produced by combustion engines or obtained in the production of nitric acid.

It has already been reported that exhaust gases containing nitrogen oxide can be decontaminated by transforming the nitrogen oxides into nitrogen. Such exhaust gases are obtained, for example, in the production of nitric acid or upon the combustion of hydrocarbons in admixture with air, in internal-combustion engines. The processes used heretofore for removing these strongly toxic ingredients from exhaust gas primarily comprise the catalytic decomposition or reduction of the nitrogen oxides to nitrogen.

A process for the catalytic reduction of nitrogen oxides in the exhaust gases obtained in the production of nitric acid has been described in U.S. Pat. No. 2,924,504. As taught therein, the exhaust gases having nitrogen oxide therein are mixed with a reducing gas, such as hydrogen, carbon monoxide or gaseous hydrocarbons, and the resulting mixture is passed over a fixed bed catalyst consisting of a metal, such as iron, cobalt, nickel or copper, on an inert carrier. The volume-space velocity of the gas mixture is less than 40,000 volume units of gas per volume unit of catalyst per hour, and the exhaust gases coming from the catalyst have a temperature substantially between 800 and 1,000°C. The conventional catalyst used in this process is not fully satisfactory, however, as it is active at temperatures lower than 1,000°C, only. In addition to this, merely minor proportions of active catalyst ingredients can be applied to the carrier. The application of relatively large metal oxide proportions would effect catalyst inactivation by self-destruction, upon any change from a reducing to a strongly oxidizing atmosphere. In other words, the catalyst finds limited use only and combines this with a limited activity.

The exhaust gases of internal combustion engines are known to contain nitrogen oxides together with minor proportions of unreacted oxygen and always together with overstoichiometric proportions — based on the nitrogen oxide content — of carbon monoxide, unburnt or partially burnt hydrocarbons, and hydrogen. Various attempts have therefore been made to use these reducing ingredients of exhaust gases for the reduction of nitrogen oxides in contact with a noble metal catalyst, such as a platinum, palladium, iridium or rhodium catalyst. Noble metal catalysts are however very costly which does not vouch for their economy, and susceptible to catalyst poisons, such as lead. In other words, the use of noble metal catalysts is confined to the decontamination of exhaust gases coming from combustion engines that are operated with gasoline free from lead.

A further process has been described in U.S. Pat. No. 3,545,917, wherein nitrogen oxides contained in exhaust gases having nitrogen oxides therein are decomposed at temperatures between 400° and 1,000°C in contact with a praseodymium oxide or lanthanum oxide catalyst with the resultant formation of nitrogen and oxygen. Nitrogen oxides undergo decomposition at a relatively low velocity however and the process has accordingly failed to gain practical interest in the decontamination of exhaust gases coming from internal combustion engines, in which high gas velocities are found to prevail.

We have now unexpectedly discovered that the catalysts used in the process of the present invention, which will be disclosed hereinafter, are free from the non-beneficial effects of the above conventional catalysts, substantially unaffected by temperature changes, inexpensive, unsusceptible to catalyst poisons, highly effective and little sensitive to ageing.

The present invention relates more particularly to a process for removing nitrogen oxides from exhaust gases, particularly from exhaust gases of internal combustion engines or from exhaust gases obtained in the production of nitric acid, by reducing the nitrogen oxides to nitrogen with the use of a reducing gas, in contact with a catalyst and at elevated temperatures, which process comprises contacting the nitrogen oxide-containing gas in admixture with at least stoichiometric proportions, based on the nitrogen oxide content of the gas, of hydrogen and/or carbon monoxide and/or a gaseous hydrocarbon reductant, at temperatures substantially between 150° and 1100°C, with a catalyst comprising a homogeneous mixture of oxides and/or aluminates of copper, nickel and manganese.

To effect the removal of nitrogen oxides from exhaust gases coming from internal combustion engines, which already have the gaseous reductant, such as hydrogen, carbon monoxide or hydrocarbons, therein, it is good practice to produce direct contact between the exhaust gas an catalyst. In those cases, however, in which the removal of nitrogen oxides from the exhaust gases obtained in the production of nitric acid is contemplated, it is necessary to use the exhaust gases in admixture with the gaseous reductant for catalytic reduction of the nitrogen oxides. Apart from hydrogen or carbon monoxide, the invention also provides for the use of gaseous hydrocarbons, such as natural gas, methane, propane and similar gases, as the reducing gas.

A preferred embodiment of the process of the present invention comprises catalytically reducing the nitrogen oxides at temperatures substantially between 300° and 850°C and flowing the nitrogen oxide — containing gas over the catalyst at a volume — space velocity between 10,000 and 30,000 liters of gas per hour per liter of catalyst.

The catalyst used in the process of the present invention for the reduction of nitrogen oxides comprises a homogeneous mixture of oxides and/or aluminates of copper, nickel and manganese.

The homogeneous mixture of the oxides and/or aluminates of copper, nickel and manganese may contain the individual elements in any desirable quantitative ratio with respect to each other, within the limits of 0.1 to 1, preferably however in a ratio by weight of 1:1:1.

It is technically good practice for the homogeneous mixture of the catalyst components, particularly for the metal aluminates, to be made into, and to be used in the form of, shapes.

In principle, it is also possible, however, for the homogeneous mixture of the metal oxides and/or aluminates to be applied to, or incorporated with, an inert carrier, such as aluminum oxide, spinel, mullite, cordierite or gehlenite, for example.

In accordance with a further preferred feature of the present invention, the carrier-supported catalyst should contain the homogeneous mixture of oxides and/or aluminates of copper, nickel and manganese in a proportion substantially between 2 and 40 weight %, preferably between 5 and 15 weight %, all calculated as metal oxides and based on the overall quantity of catalyst and carrier.

The reduction catalyst should preferably be made by impregnating the carrier with an aqueous solution, saturated while hot, of copper, nickel and manganese salts of volatile acids, which preferably are the nitrate salts; drying the carrier so impregnated with the aqueous solution at temperatures substantially between 90° and 150°C; and treating the dry product at temperatures substantially between 200° and 450°C so as to effect decomposition of the metal salts with the resultant formation of the corresponding metal oxides.

The step of drying the salt-containing carrier may be effected at 110°C, for example, and the salt should conveniently be decomposed at temperatures between 350° and 400°C, following the drying step.

To produce the aluminates of copper, nickel and manganese, it is good practice first to impregnate aluminum oxide, which may be produced, for example, by subjecting $\alpha$-Al(OH)$_3$ to annealing treatment at 1,000°C, with an aqueous solution, saturated while hot, of copper, nickel and manganese salts of volatile acids, and thereafter to dry the aluminum oxide so impregnated with the aqueous salt solution, at temperatures substantially between 90° and 150°C. Following this, the dried product is treated at temperatures between 200° and 450°C to effect decomposition of the metal salts with the resultant formation of the corresponding metal oxides, and the resulting mixture of aluminum oxide and metal oxides is heated to temperatures between 900° and 1,100°C to effect transformation into metal aluminates.

The aluminates should preferably be made using an aqueous solution of the nitrate salt of copper, nickel and manganese, the same as that used for making the metal oxides.

The aluminates should more preferably be made by a process, wherein the aluminum oxide impregnated with the aqueous salt solution is dried at a temperature substantially of 110°C, the resulting dry product is heated to temperatures between 350° and 450°C so as to effect formation of the metal oxides, and the metal oxides are annealed together with the aluminum oxide at temperatures between 1,000° and 1,050°C and converted to aluminates.

As already mentioned hereinabove, the reduction in accordance with this invention of nitrogen oxides contained in exhaust gases should be effected with the use of reductants including, for example hydrogen, carbon monoxide or gaseous reducing hydrocarbons, unless exhaust gases having these reductants therein are concerned.

Exhaust gases which come from internal combustion engines and which are to be freed from nitrogen oxides in accordance with this invention, are composed, for example, of:

1 000 – 3 000 ppm (ppm stands for parts per million) of nitrogen oxides,
5 000 – 40 000 ppm of carbon monoxide,
500 – 5 000 ppm of hydrocarbons,
100 – 1 000 ppm of hydrogen,
1 000 – 10 000 ppm of oxygen, more than 10 % by volume of $CO_2$ and $H_2O$, the balance being nitrogen.

Such exhaust gases do not call for the addition of reductants. They are normally delivered to the catalyst in the form they have on leaving the combustion engine. Due to the strong pulsation of these gases, which is produced upon evacuation of the combustion chamber, the gases are found to issue at different velocities, namely at an average velocity between 15,000 and 100,000 liters of gas per hour per liter of catalyst, based on a temperature of 25°C and atmospheric pressure. The gases have temperatures between 150° and 1,100°C, particularly between 500° and 800°C.

The process of the present invention enables nitrogen oxide-containing exhaust gases with the above or similar composition to be freed substantially completely from nitrogen oxides. The activity of the catalyst used therein could not be found to decrease even after prolonged use, particularly at high temperatures between 1,000° and 1,100°C, for example.

EXAMPLE 1 a. Catalyst preparation

The starting material was an aqueous solution, saturated while hot, which contained:
80 grams of $Cu(NO_3)_2 \cdot 3 H_2O$,
94 grams of $Ni(NO_3)_2 \cdot 6 H_2O$ and
82 grams of $Mn(NO_3)_2 \cdot 4 H_2O$.
425 grams of $\alpha$-Al$_2$O$_3$, which was produced by subjecting $\alpha$-Al(OH)$_3$ to annealing treatment at 1,000°C, were introduced thereinto and the resulting viscous magma was dried at 110°C within 12 hours. Following this, the temperature was gradually raised substantially to 450°C so as to effect decomposition of the nitrate salts. The end of the decomposition reaction was indicated by reduced evolution, or disappearance, of nitrogen oxide vapors, which were initially liberated. The resulting pulverulent product was made into pellets 3 mm wide and long.

A relatively small portion of the pellets so made was heated to 800°C over a period of 17 hours, while the bulk portion thereof was annealed at 1,050°C over a period of 17 hours. It was possible by X-ray diffraction to demonstrate the presence of metal oxides in the material heated at 800°C and the presence of aluminates in the material annealed at 1,050°C.

b. Use of catalyst

The aluminate catalyst prepared in the manner described under (1a) above was tested as to its efficiency on a gas mixture composed of
1 000 ppm of NO,
20 000 ppm of CO,
2.5 % by volume of $H_2O$,
the balance being $N_2$.

The gas mixture was passed over the catalyst at a volume-space velocity of 30,000 liters of gas per hour per liter of catalyst. The gas and catalyst were continuously heated and the residual content of NO in the exhaust gas coming from the catalyst was indentified at various catalyst temperatures. The results indicated in the following Table 1 were produced:

Table 1

| Catalyst temperature °C | Residual NO-content in exhaust gas ppm |
| --- | --- |
| 225 | 990 |
| 250 | 800 |
| 260 | 500 |

Table 1-Continued

| Catalyst temperature °C | Residual NO-content in exhaust gas ppm |
| --- | --- |
| 275 | 300 |
| 300 | 200 |
| 325 | 100 |

As can be seen from Table 1, the residual NO-content in the exhaust gas was found to decrease with increasing temperatures.

EXAMPLE 2

The procedure was the same as that described in Example 1, save that the gas mixture was passed over the catalyst at a volume-space velocity of 33,000 liters of gas per hour per liter of catalyst. The gas and catalyst were jointly heated to a temperature of 950°C and the residual NO-content in the exhaust gas was identified at various catalyst temperatures.

50 % by volume of the NO initially present in the gas mixture were found to have been reduced to nitrogen at 265°C, and more than 96 % of the nitrogen oxide were found to have been reduced to nitrogen at temperatures higher than 350°C. After an operation period of 48 hours at a catalyst temperature of 950°C, the hot stream of gas and the catalyst were cooled down to 160°C and reheated again to 950°C. Following this, a temperature as high as 295°C was necessary to effect the reduction of 50 % by volume of the nitrogen initially present.

After altogether 100 hours of operation at 950°C, the above cooling step was repeated and gas and catalyst were heated once again to 950°C. 50 % of the nitrogen oxide were found to have been reduced to nitrogen at a temperature of 300°C.

The temperature necessary to effect a 50 % conversion was found to increase relatively slightly over an operational period of more than 100 hours from initially 265°C to 300°C, and this for an artificially aged catalyst. In other words, the catalyst was highly efficient even under extreme experimental conditions.

EXAMPLE 3

This Example was carried out with the use of the metal aluminate catalyst produced in the manner described in Example (1a) above. Exhaust gas which originated from the production of nitric acid and which was mixed with carbon monoxide was passed thereover. The exhaust gas was composed of:

3,000 ppm of NO,
3.0 % by volume of $O_2$,
6.5 % by volume of CO,
2.0 % by volume of $H_2O$,
the balance being $N_2$.

The exhaust gas and the catalyst were heated together. At a gas temperature of 200°C, the catalyst bed suddenly underwent a temperature increase by substantially 200°C. This was caused by the combustion of carbon monoxide. 50 and 95 % by volume of the nitrogen oxide passed over the catalyst were found to have been reduced to nitrogen at gas temperature of 300°C and 400°C, respectively. The limit of visibility of $NO_2$ in the exhaust gas, which was substantially at 300 ppm, was reached at a gas temperature of 350°C. The gas was passed over the catalyst at a volume-space velocity of 30,000 liters of gas per hour per liter of catalyst.

I claim:

1. A process for removing nitrogen oxides from exhaust gases, by reducing the nitrogen oxides to nitrogen with the use of a gaseous reductant, in contact with a catalyst and at elevated temperatures, which comprises contacting the nitrogen oxide-containing gas in admixture with at least stoichiometric proportions, based on the nitrogen content of the gas, of at least one member selected from the group consisting of hydrogen, carbon monoxide and gaseous hydrocarbon reductants, at temperatures substantially between 150° and 1,100°C., with a homogeneous mixture of copper, nickel and manganese aluminates as catalysts, elements Cu, Ni, Mn being in the said mixtures in any desirable ratio with respect to each other within the limits of 0.1 to 1.

2. The process as claimed in claim 1, wherein combustion engine exhaust gases containing NO, CO, $H_2O$, and $N_2$ and exhaust gas originating from the production of nitric acid and containing NO, $O_2$, CO, $H_2O$ and $N_2$ are freed separately from the nitrogen oxides therein.

3. The process as claimed in claim 1, wherein the exhaust gases of internal combustion engines are freed from nitrogen oxides by directly contacting the gases with, or flowing them over, the catalyst.

4. The process as claimed in claim 1, wherein the exhaust gases obtained in the production of nitric acid are mixed with the gaseous reductant and the resultant mixture is freed from the nitrogen oxides therein by catalytic reduction of the nitrogen oxides.

5. The process as claimed in claim 4, wherein the hydrocarbon reductant is natural gas, methane or propane.

6. The process as claimed in claim 1, wherein the nitrogen oxides are catalytically reduced at temperatures substantially between 300° and 850°C.

7. The process as claimed in claim 1, wherein the nitrogen oxide-containing gas is passed over the catalyst at a volume-space velocity between 10,000 and 30,000 liters of gas per hour per liter of catalyst.

8. The process as claimed in claim 1, wherein the homogeneous mixture contains the individual elements in a ratio by weight of Cu:Ni:Mn = 1:1:1.

9. The process as claimed in claim 1, wherein the homogeneous mixture of the aluminates of copper, nickel and manganese is pelletized.

10. The process as claimed in claim 1, wherein the homogeneous mixture of the aluminates of copper, nickel and manganese is deposited on an inert carrier.

11. The process as claimed in claim 10, wherein the inert carrier is aluminum oxide, spinel, mullite, cordierite or gehlenite.

12. The process as claimed in claim 10, wherein the carrier-supported catalyst contains the homogeneous mixture of aluminates of copper, nickel and manganese in a proportion substantially between 2 and 40 weight %, all calculated as metal oxides and based on the overall quantity of catalyst and carrier.

13. The process as claimed in claim 1, wherein the carrier-supported catalyst contains the homogeneous mixture in a proportion between 5 and 15 weight %, all calculated as metal oxides and based on the overall quantity of catalyst and carrier.

* * * * *

UNITED STATES PATENT AND TRADEMARK OFFICE
CERTIFICATE OF CORRECTION

PATENT NO. : 3,880,982
DATED : April 29, 1975
INVENTOR(S) : Jurgen Stenzel

It is certified that error appears in the above–identified patent and that said Letters Patent are hereby corrected as shown below:

Please insert --Assignee: Hoechst Aktiengesellschaft, Frankfurt am Main, Germany --

Signed and Sealed this second Day of December 1975

[SEAL]

Attest:

RUTH C. MASON
*Attesting Officer*

C. MARSHALL DANN
*Commissioner of Patents and Trademarks*